United States Patent [19]

Fujishiro et al.

[11] Patent Number: 5,590,016
[45] Date of Patent: Dec. 31, 1996

[54] MULTILAYER THROUGH TYPE CAPACITOR ARRAY

[75] Inventors: Yoshikazu Fujishiro; Takaya Ishigaki, both of Akita-ken; Hiraku Harada, Yamagata-ken, all of Japan

[73] Assignee: TDK Corporation, Tokyo, Japan

[21] Appl. No.: 356,834

[22] Filed: Dec. 14, 1994

[30] Foreign Application Priority Data

Dec. 16, 1993 [JP] Japan ................. 5-316577

[51] Int. Cl.$^6$ ................. H01G 4/20; H01G 4/34
[52] U.S. Cl. ........... 361/313; 361/321.2; 361/328; 361/330; 174/264
[58] Field of Search ................. 361/301.1, 301.2, 361/306.3, 307, 308.1, 312, 313, 321.2, 328, 330; 174/262, 263, 264, 265, 266, 267

[56] References Cited

U.S. PATENT DOCUMENTS

| | | | |
|---|---|---|---|
| 4,074,340 | 2/1978 | Leigh | 361/321 |
| 4,665,465 | 5/1987 | Tanabe | 361/306.3 |
| 4,904,967 | 2/1990 | Morii et al. | 361/321 X |
| 4,935,844 | 6/1990 | Burn | 361/321 |
| 5,028,743 | 7/1991 | Kawakami et al. | 174/264 |

Primary Examiner—Kristine L. Kincaid
Assistant Examiner—Chau N. Nguyen
Attorney, Agent, or Firm—Hecker & Harriman

[57] ABSTRACT

The invention decreases crosstalk due to capacitive coupling between through type capacitor elements in a multilayer through type capacitor array. On dielectric sheets between electrodes, which constitute a multi capacitor array, through-holes filled with conductive materials are formed, where a central conductor is not present. By electrically connecting conductive materials filled in the through-holes, electrostatic shielding is provided between the through type capacitor elements. Electrical connection is achieved through conductive layers formed outside or inside the through type capacitor elements.

21 Claims, 6 Drawing Sheets

(PRIOR ART)

(PRIOR ART)

MULTILAYER THROUGH TYPE CAPACITOR ARRAY

BACKGROUND OF THE INVENTION

1. Field of the Invention

The present invention relates to a ceramic multilayer through type capacitor array, comprising at least two or more multilayer through type capacitors in a ceramic chip.

With rapid growth of various types of electronic devices and equipment, these devices and equipment are increasingly produced in miniaturized and lightweight design. In particular, miniaturization and lightweight design are being used in electronic devices and equipment of portable type such as camera-integrated video tape recorders, portable telephone sets, note type personal computers, palmtop computers, etc.

With the propagation of miniaturization and lightweight design of the electronic devices and equipment, electronic parts are also increasingly produced in miniaturized and lightweight designs. The means for mounting electronic parts are also changing from conventional means for inserting and soldering electronic parts and pins used in through-hole on conventional type printed circuit board to surface mounting technology (SMT) for mounting and soldering electronic parts on conductive patterns provided on printed circuit boards.

The electronic parts used in SMT are generally called surface mounting devices (SMD), and these include semiconductor parts as well as capacitors, resistors, inductors, filters, etc. (Among them, small parts such as capacitors and resistors are called chips.)

Among ceramic chip parts, there are composite parts called capacitor arrays and resistor arrays where a plurality of circuit elements, e.g. capacitors, resistors, or inductors, are incorporated. A multilayer capacitor array, comprising a plurality of ceramic multilayer capacitors, is a typical example of multilayer array parts.

Japanese laid-open publications Nos. 55-80319, 57-206015 and 57-206016 disclose a multilayer through type capacitor array consisting of capacitors, each of which is a through type capacitor.

To explain the structure of a conventional type multilayer through type capacitor array, FIGS. 1a through 1k show a multilayer through type capacitor array, which comprises four dielectric layers where four multilayer through type capacitor elements are combined together.

This multilayer through type capacitor array comprises a first dielectric sheet 1, a second dielectric sheet 2, a third dielectric sheet 3, and a fourth dielectric sheet 4, each designed in rectangular form and laid in this order.

FIGS. 1b, 1d, 1f, and 1h represent cross-sectional views of the dielectric sheets of FIG. 1a, 1c, 1e, and 1g along the lines b—b, d—d, f—f, and h—h respectively.

On the first dielectric sheet 1, an internal electrode 5 made of conductive material, extended in longitudinal direction of the rectangle and reaching the two shorter sides of the rectangle, is provided as shown in FIGS. 1g and 1h. On the second dielectric sheet 2, four internal electrodes 6, made of conductive material, extended in lateral direction of the rectangle and reaching the two longer sides of the rectangle, are provided as shown in FIGS. 1e and 1f. On the third dielectric sheet 3, an internal electrode 7 made of conductive material, extended in longitudinal direction of the rectangle and reaching only the shorter sides (similar to the internal electrode 5 on the first dielectric sheet 1) is provided. On upper surface of the dielectric sheet 3, the dielectric sheet 4 shown in FIGS. 1a and 1b having no internal electrode is placed.

External configuration of the multilayer through type capacitor array with the above structure is shown in FIG. 1i, and a cross-sectional view along the line j—j is given in FIG. 1j.

On the internal electrodes 6, four terminal electrodes 8 are formed, which are extended partially on mounting surfaces, i.e. upper and lower surfaces, by means such as printing. This is done in order to connect each of the multilayer through type capacitors, constituting the multilayer through type capacitor array, to an external printed circuit pattern. On the internal electrodes 5 and 7, two terminal electrodes 9 are formed, which are extended partially on mounting surfaces, i.e. upper and lower surfaces, by means such as printing in order to connect each of the multilayer through type capacitors, constituting the multilayer through type capacitor array, to an external printed circuit pattern.

Electrical connection diagram of the multilayer through type capacitor array is shown in FIG. 1k.

The multilayer through type capacitor array with the above arrangement comprises four multilayer through type capacitors, which have internal conductors 6 as central conductors and internal conductors 5 and 7 sandwiching the internal conductors 6 as external conductors. The through type capacitor is used by grounding the external conductor. In the multilayer through type capacitor array, the internal conductors 5 and 7, serving as common external conductors, are grounded by the terminal electrode 9.

The common external conductors 5 and 7 have impedance components. Because these impedance components serve as common impedance for four through type capacitors, crosstalk occurs via these impedance components.

In the multilayer through type capacitor array with the above arrangement, the distance from the external conductor of the multilayer through type capacitor, which uses internal conductors arranged inside as a central conductor, to the terminal electrode is longer than the distance from external conductor of the multilayer through type capacitor, which uses internal conductors arranged outside as a central conductor, to the terminal electrode.

For this reason, the inductance component of the external conductor in the multilayer through type capacitor, which uses an internal conductor arranged inside as central conductor, is different from the inductance component of the external conductor in the multilayer through type capacitor, which uses an internal conductor arranged outside as central conductor, and this makes electrical characteristics of capacitor array non-uniform, although it should be uniform.

Further, the distance between the multilayer through type capacitors, which constitute the multilayer through type capacitor array, is small, and multilayer through type capacitor elements are separated only by dielectric substances. In addition, central conductors of the adjacent multilayer through type capacitor elements are not completely covered by external conductors. Thus, capacitive coupling often occurs between the adjacent multilayer through type capacitor elements.

Capacitive coupling, although undesirable, is tolerable when operating frequency of the circuit is low. However, in a circuit where the operating frequency is over several hundreds of MHz such as portable telephone sets, crosstalk can occur between signals which pass through the multilayer through type capacitors adjacent to each other, and this often leads to undesirable consequences such as a decrease of signal-to-noise ratio or malfunction of the device incorporating the multilayer through type capacitors in the worst case.

FIGS. 2a through 2k show a conventional multilayer through type capacitor array, which solves the problems of the multilayer through type capacitor array of FIGS. 1a through 1k such as the problem due to common impedance or the problem of non-uniform electrical characteristics.

In the multilayer through type capacitor array of FIGS. 1a through 1k, the terminal electrodes of the external conductor in each multilayer through type capacitor are used in common, while in the multilayer through type capacitor array of FIGS. 2a through 2k, a terminal electrode of external conductor is provided on each of the multilayer through type capacitors.

This multilayer through type capacitor array also comprises a first dielectric sheet 11, a second dielectric sheet 12, a third dielectric sheet 13, and a fourth dielectric sheet 14, each designed in rectangular form and laid in that order (similar to the multilayer through type capacitor array of FIGS. 1a to 1k).

FIGS. 2b, 2d, 2f and 2h each represents a cross-sectional view of the dielectric sheets 11, 12, 13 and 14 of 2a, 2c, 2e and 2g respectively along the lines b—b, d—d, f—f and h—h.

On the first dielectric sheet 11, three internal terminal electrodes 15 made of conductive material, extended in the lateral direction of the rectangle and reaching the two longer sides of the rectangle, and an internal electrode 18 integrated with internal electrodes 15, extended in lateral direction of the rectangle and reaching none of the sides of the rectangle, are provided as shown in FIGS. 2g and 2h. On the second dielectric sheet 12, four internal electrodes 16 made of conductive material, extended in lateral direction of the rectangle and reaching the two longer sides at which the positions do not correspond to the internal electrodes 15, are provided as shown in FIGS. 2e and 2f. On the third dielectric sheet 13, three internal terminal electrodes 17 made of conductive material, extended in lateral direction of the rectangle and reaching the two longer sides, and an internal electrode 19 integrated with the internal electrodes 17, extended in lateral direction of the rectangle and reaching none of the sides of the rectangle, are provided as shown in FIGS. 2c and 2d. On upper surface of the dielectric sheet 13, a dielectric sheet 14 having no internal electrodes as shown in FIGS. 2a and 2b is placed.

The external configuration of the multilayer through type capacitor array with the above arrangement is shown in FIG. 2i, and a cross-sectional view along the line j—j is given in FIG. 2j.

On the internal terminal electrodes 15 and the internal terminal electrodes 17, three terminal electrodes 21 are provided, which are extended partially on mounting surfaces, i.e. upper and lower surfaces, by means such as printing. This is done in order to connect each of the multilayer through type capacitors, constituting a multilayer through type capacitor array, to external printed circuit pattern. On the internal electrodes 16, four terminal electrodes 20 are provided, which are extended partially on mounting surfaces, i.e. upper and lower surfaces, by means such as printing. This is done in order to connect each of the multilayer through type capacitors, constituting a multilayer through type capacitor array, to an external printed circuit pattern.

In each of the multilayer through type capacitors, which constitute the multilayer through type capacitor array, the internal electrodes 16 are used as central conductors, and the internal electrodes 18 and 19 are used as external conductors to sandwich the internal electrodes 16. These internal electrodes 16 as well as the internal electrodes 18 and 19 constitute the multilayer through type capacitor.

In the multilayer through type capacitor array, each of the terminal electrodes 15 and 17 are provided to correspond to sparings between the internal electrodes 16, serving as central conductors. Because these internal terminal electrodes 15 and 17 are grounded, impedance components of the external conductors do not provide common impedance even when the external conductors 18 and 19 are integrated, and no crosstalk occurs via these impedance components.

Also, the distances between the external conductor and the internal terminal electrode in each capacitor, which constitutes the multilayer through type capacitor array, are equal. Therefore, in this multilayer through type capacitor, inductance component of the external conductor in the multilayer through type capacitor, which uses the internal conductor arranged inside as central conductor, is equal to inductance component of the external conductor in the multilayer through type capacitor, which uses the internal conductor arranged outside as central conductor. Thus, the problem which makes characteristics of the capacitors of the capacitor array non-uniform, does not occur.

However, because three terminal electrodes 21 connected to external electrodes are provided between four terminal electrodes 20 connected to central electrode, the structure of the terminal electrodes are complicated, and it is difficult to miniaturize the multilayer through type capacitor array. Also, there are difficulties in manufacturing and mounting because spacings between the terminal electrodes are small.

Because spacings between the multilayer through type capacitor elements provided inside are small, the multilayer through type capacitor elements are adjacent to each other via dielectric substances, and central conductors of the multilayer through type capacitor elements adjacent to each other are not completely covered with the external conductors. For this reason, serious problems, such as crosstalk due to capacitive coupling between the adjacent multilayer through type capacitor elements, decrease of signal-to-noise ratio, or malfunction of devices incorporating the multilayer through type capacitors are not solved.

An electrical connection diagram of the multilayer through type capacitor array is shown in FIG. 2k.

SUMMARY OF THE INVENTION

To solve the above problems, it is an object of the present invention to provide a multilayer through type capacitor, in which crosstalk due to capacitive coupling between the multilayer through type capacitor elements is reduced despite a simple terminal electrode configuration.

For this purpose, a shielding electrode is provided in the present invention between multilayer through type capacitor elements, which constitute the multilayer through type capacitor array, and the external conductor of the multilayer through type capacitor is connected to this shielding electrode.

By such an arrangement, electrostatic shielding can be achieved between the multilayer through type capacitor elements, which constitute the multilayer through type capacitor array, despite a simple terminal electrode configuration. As a result, capacitive coupling is decreased, and crosstalk between signals passing through the adjacent multilayer through type capacitors is reduced.

DETAILED DESCRIPTION OF THE INVENTION

FIGS. 3a through 3k represent an embodiment of a multilayer through type capacitor array of the present invention, which comprises a four-layer dielectrics combining four multilayer through type capacitors as in the conventional multilayer through type capacitor array of FIGS. 1a to 1k.

This multilayer through type capacitor array comprises a first dielectric sheet 31, a second dielectric sheet 32, a third dielectric sheet 33 and a fourth dielectric sheet 34, each designed in rectangular form and layered in that order.

FIGS. 3b, 3d, 3f and 3h each represents a cross-sectional view of a dielectric sheet of 3a, 3c, 3e and 3g respectively along the lines b—b, d—d, f—f and h—h.

Figure 3A:
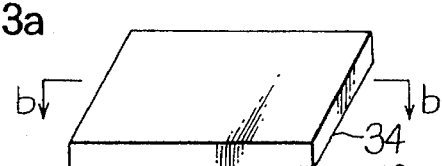
FIGS. 3a through 3k represent internal configuration, overall configuration, and cross-sectional views of a multilayer through type capacitor array of a first embodiment of the present invention.
Figure 3B:
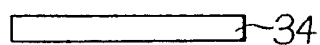
Figure 3C:
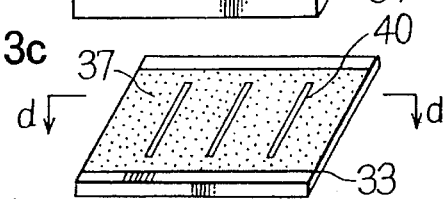
Figure 3D:
Figure 3E:
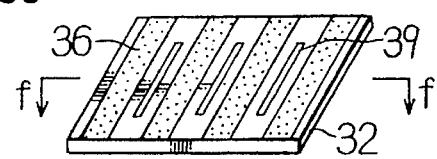
Figure 3F:
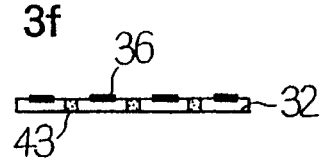
Figure 3G:
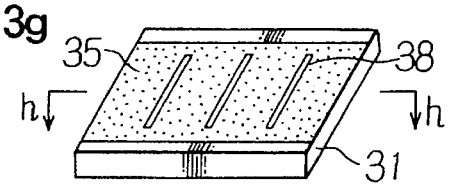

As shown in FIG. 3g, on the first dielectric sheet 31, an internal electrode 35 made of conductive material, extended in longitudinal direction of the rectangle and reaching the two shorter sides of the rectangle, is provided. At positions equally dividing this internal electrode 35, three through-holes 38 penetrating the first dielectric sheet 31 are formed.

Figure 3H:
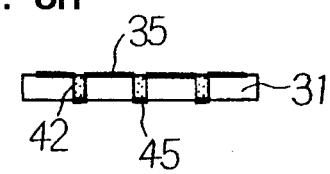

As shown in FIG. 3h, conductive materials 42 are filled in through-holes 38, and a conductive layer 45 is provided on each of the conductive materials 42 exposed to surface of the first dielectric sheet 31 where the internal electrode 35 is not present. Conductive layer 45 is not necessarily required.

As shown in FIG. 3e, on the second dielectric sheet 32, four internal electrodes 36 made of conductive material, extended in lateral direction of the rectangle and reaching the two longer sides of the rectangle, are provided. Between these internal electrodes 36 and at positions corresponding to where three through-holes 38 penetrating the first dielectric sheet 31 are formed, three through-holes 39 penetrating the second dielectric sheet 32 are formed. As shown in FIG. 3f, these through-holes 39 are filled with conductive materials 43.

As shown in FIG. 3c, on the third dielectric sheet 33, an internal electrode 37 made of conductive material, extended in longitudinal direction of the rectangle and reaching the two shorter sides (similar to the internal electrode 35 on the first dielectric sheet 31), is provided. At the position equally dividing this internal electrode 37, three through-holes 40 penetrating the third dielectric sheet 33 are formed. On upper surface of the placed dielectric sheet 33, the dielectric sheet 34 shown in FIGS. 3a and 3b having no internal electrode is placed.

Figure 3I:
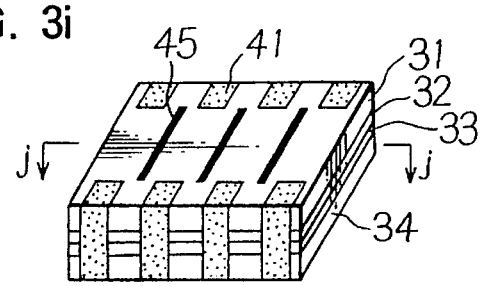
Figure 3J:
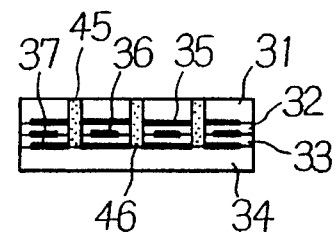

External configuration of the multilayer through type capacitor array with the above arrangement, turned upside down and seen from below, is shown in FIG. 3i and a cross-sectional view along the line j—j is shown in FIG. 3j.

On the internal electrodes 36, four terminal electrodes 41 are formed, which are partially extended on mounting surfaces, i.e. upper and lower surfaces, by means such as printing in order to connect each of the multilayer through type capacitor, constituting the multilayer through type capacitor array, to external printed circuit pattern. These terminal electrodes 41 are partially extended on mounting surfaces, i.e. upper and lower surfaces, but the extended portions are not necessarily required. The internal electrodes 35 and 37 are electrically connected to the conductive materials 46 integrating the conductive materials 42, 43 and 44 filled in the through-holes 38, 39 and 40 and are further electrically connected to the conductive layers 45 formed on the conductive materials 46.

The conductive materials 46 thus formed are arranged between the multilayer through type capacitors, which constitute the multilayer through type capacitor array. Therefore, by grounding the conductive layer 45 connected to the conductive materials, electrostatic shielding between the multilayer through type capacitors can be achieved, and this prevents crosstalk, which causes problems in the conventional type multilayer through type capacitor array.

Figure 3K:
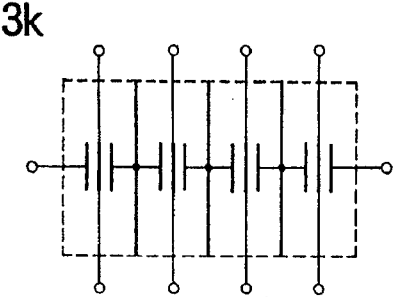

Electrical connection diagram of this multilayer through type capacitor array is shown in FIG. 3k.

In this multilayer through type capacitor array, unlike conventional multilayer through type capacitor of FIGS. 1a to 1k, the internal electrodes 35 and 37, constituting external conductors of four multilayer through type capacitors, are grounded via the conductive material 46. As a result, there is no influence from common impedance due to external conductors in these multilayer through type capacitor arrays. Thus, no crosstalk occurs.

In this multilayer through type capacitor array, unlike the conventional multilayer through type capacitor of FIGS. 1a to 1k, the distance from the external conductor of the multilayer through type capacitor arranged inside to the grounding terminal is equal to the distance from the external conductor of the multilayer through type capacitor arranged outside to the grounding terminal. As a result, electrical characteristics of the multilayer through type capacitors are uniform.

Further, in this multilayer through type capacitor array, unlike the conventional multilayer through type capacitor of FIGS. 2a to 2k, the terminal electrode to connect the external conductor is arranged at a different position from that of the terminal electrode to connect the internal conductor. This makes it possible to miniaturize multilayer through type capacitor array and reduce difficulties when mounting.

FIGS. 4a to 9b show further modified embodiments of the invention.

In these figures, external configurations of multilayer through type capacitor array of the embodiments are shown in "a"s, and cross-sectional views along the line b—b are given in "b"s. To simplify explanation, descriptions and symbols are not given for the same portion as in the embodiment of FIGS. 3a to 3k.

To simplify explanation, in the multilayer through type capacitor array of FIGS. 4a and 4b, external configuration and cross-section, turned upside down and seen from below, are shown similarly to the multilayer through type capacitor array of the embodiment of FIGS. 3i and 3j.

Figure 4A:
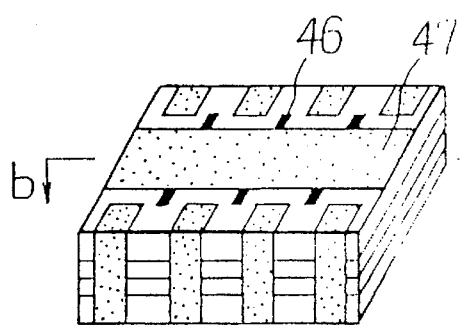
FIGS. 4a and 4b represent an overall configuration and a cross-sectional view of a multilayer through type capacitor array of a second embodiment of the present invention.

In the multilayer through type capacitor array of this embodiment, conductors 46 of the multilayer through type capacitor array of FIG. 4a are connected by the terminal electrode 47, and this ensures reliable soldering when mounting.

Figure 4B:
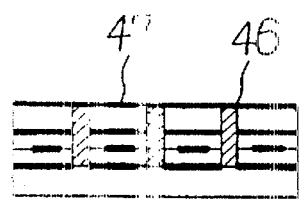
Figure 5B:
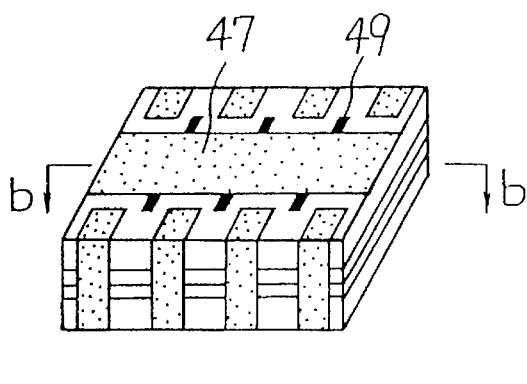
FIGS. 5a and 5b represent an overall configuration and a cross-sectional view of a multilayer through type capacitor array of a third embodiment of the present invention.
Figure 5A:
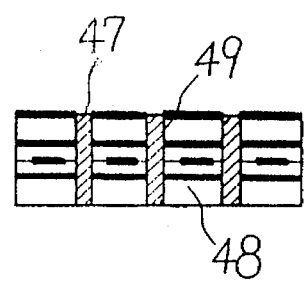

In a multilayer through type capacitor array of the embodiment shown in FIGS. 5a and 5b, instead of the fourth dielectric sheet 34 of the multilayer through type capacitor array of FIGS. 4a and 4b, a fourth dielectric sheet 48 having through-holes is placed. Conductive materials 49 are provided by filling conductive materials inside these through-holes. This makes it possible to provide a more reliable shielding effect.

Figure 6B:
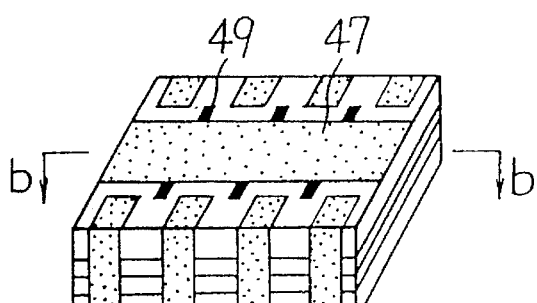
FIGS. 6a and 6b represent an overall configuration and a cross-sectional view of a multilayer through type capacitor array of a fourth embodiment of the present invention.
Figure 6A:
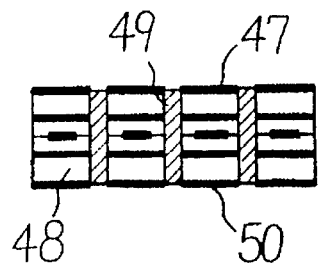

In a multilayer through type capacitor array of the embodiment of FIGS. 6a and 6b, in addition to the terminal electrode 47 of the multilayer through type capacitor array of FIG. 5a and 5b, another terminal electrode 50 is provided on the opposite side. This makes it possible to provide a more reliable shielding effect by another terminal electrode 50.

Figure 7A:
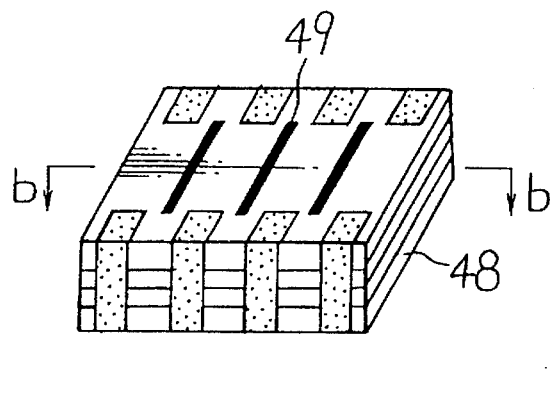
FIGS. 7a and 7b represent an overall configuration and a cross-sectional view of a multilayer through type capacitor array of a fifth embodiment of the present invention.
Figure 7B:
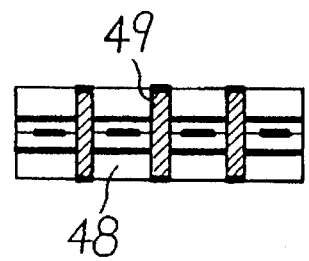

In a multilayer through type capacitor array of the embodiment of FIGS. 7a and 7b, instead of the fourth dielectric sheet 34 of the multilayer through type capacitor array of FIGS. 3a to 3k, a fourth dielectric sheet 48 having through-holes is placed. Conductive materials 49 are provided by filling conductive materials inside these holes.

In the multilayer through type capacitor array with the above arrangement, there is no need to care about front side or rear side of the multilayer through type capacitor array when mounting.

Figure 1A:
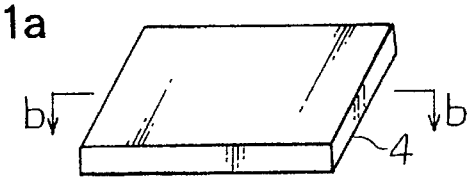
FIGS. 1a through 1k represent internal configuration, overall configuration and cross-sectional views of a conventional multilayer through type capacitor array.
Figure 1B:
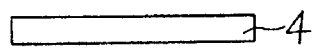
Figure 1C:
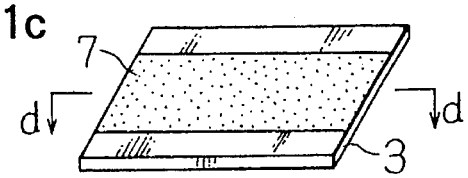
Figure 1D:
Figure 1E:
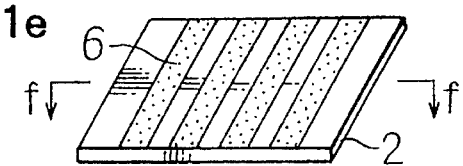
Figure 1F:
Figure 1G:
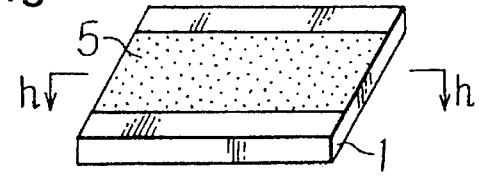
Figure 1H:
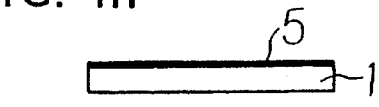
Figure 1I:
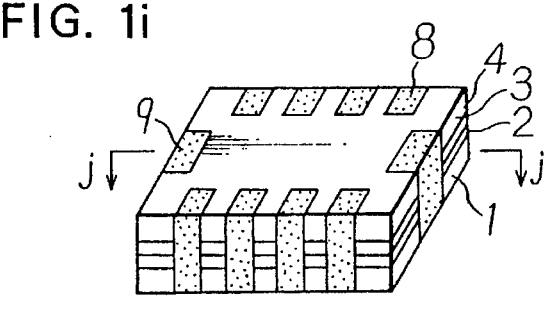
Figure 1J:
Figure 1K:
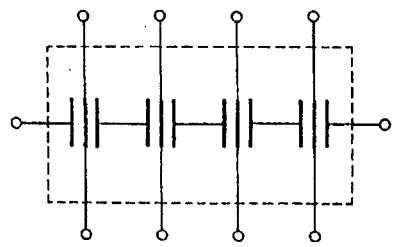
Figure 2A:
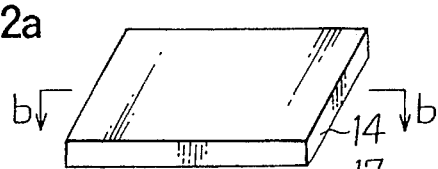
FIGS. 2a through 2k represent internal configuration, overall configuration and cross-sectional views of another conventional multilayer through type capacitor array.
Figure 2B:
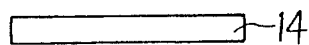
Figure 2C:
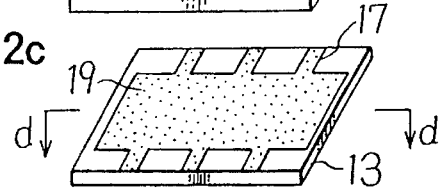
Figure 2D:
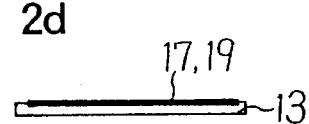
Figure 2E:
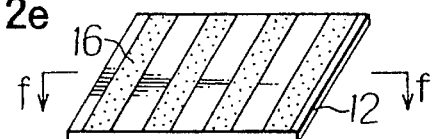
Figure 2F:
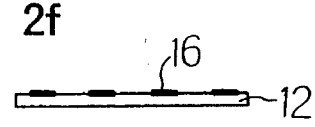
Figure 2G:
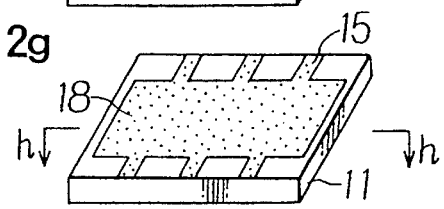
Figure 2H:
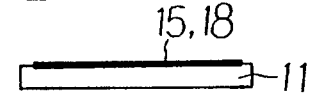
Figure 2I:
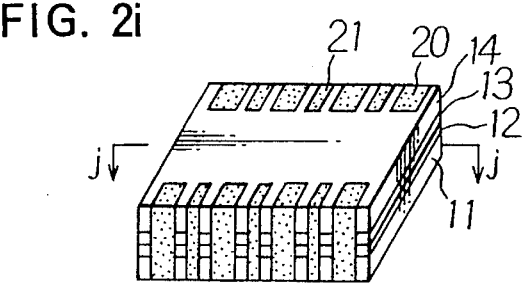
Figure 2J:
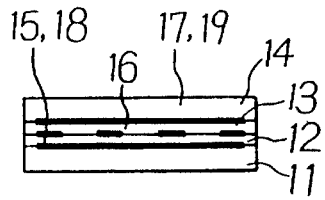
Figure 2K:
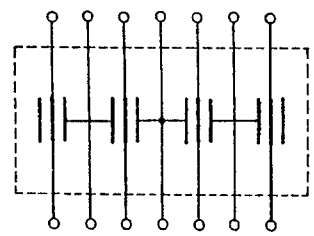
Figure 8A:
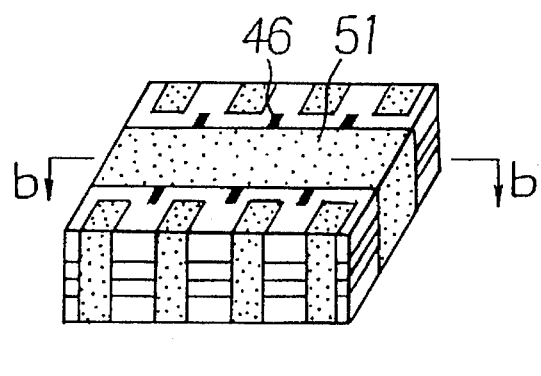
FIGS. 8a and 8b represent an overall configuration and a cross-sectional view of a multilayer through type capacitor array of a sixth embodiment of the present invention.
Figure 8B:
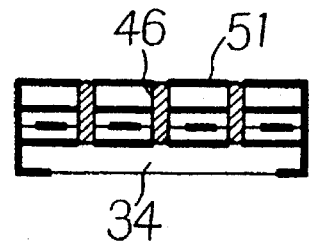

In a multilayer through type capacitor array of the embodiment of FIGS. 8a and 8b, a terminal electrode similar to the terminal electrode 9 of the conventional multilayer through type capacitor array of FIGS. 1i and 1j is provided on the multilayer through type capacitor array having conductive material 46 shown in FIGS. 4a and 4b, and a terminal electrode 51 is provided by integrating this terminal electrode with terminal electrode 47 of the multilayer through type capacitor array of the embodiment shown in FIG. 4.

In the multilayer through type capacitor array with the above arrangement, this terminal electrode 51 can ensure further shielding effect, and there is no need to care about front side or rear side of the multilayer through type capacitor array when mounting.

Figure 9A:
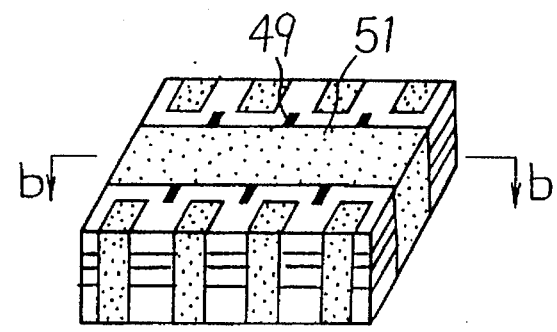
FIGS. 9a and 9b represent an overall configuration and a cross-sectional view of a multilayer through type capacitor array of a seventh embodiment of the present invention.
Figure 9B:
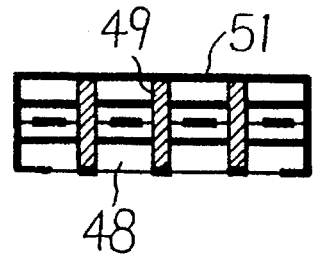

In a multilayer through type capacitor array of the embodiment shown in FIGS. 9a and 9b, a terminal electrode similar to the terminal electrode 9 of the conventional multilayer through type capacitor array of FIGS. 1i and 1j is provided on the multilayer through type capacitor array having the conductor 49 in FIGS. 5a and 5b so that a terminal electrode is provided by integrating this terminal electrode with terminal electrode 47 of the multilayer through type capacitor array of the embodiment shown in FIGS. 5a and 5b.

In the multilayer through type capacitor array with the above arrangement, this terminal electrode 51 can ensure further shielding effect, and there is no need to care about front side or rear side of the multilayer through type capacitor array when mounting.

In the embodiments shown in FIGS. 3a to 7b among the embodiments explained in connection with FIGS. 3a to 9b, the internal conductors of the multilayer through type capacitors provided inside are completely enclosed by the external conductors and conductive materials, while the internal conductors of the multilayer through type capacitors provided outside are not completely enclosed.

On the contrary, in the embodiments shown in FIGS. 8a, 8b and 9a, 9b, the internal conductors of the multilayer through type capacitors provided outside are completely enclosed by the external conductors, conductive materials and connection electrodes.

By the above arrangement, it is possible to produce a multilayer through type capacitor array which provides uniform electrical characteristics for each of the multilayer through type capacitors.

FIGS. 10a to 12b each represents a configuration example of an array of multilayer through type capacitors, in which internal conductors of the multilayer through type capacitor provided outside are completely enclosed by external conductors, conductive materials and connection electrodes.

In these figures, "a"s represent external configuration of the multilayer through type capacitor array of the embodiments, and "b"s represent a cross-sectional view along the line b—b. To simplify explanation, descriptions and symbols are not given for the same portion as in the embodiment of FIG. 3a to 3k.

Figure 10A:
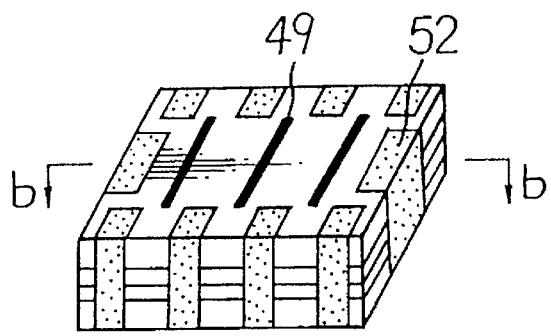
FIGS. 10a and 10b represent an overall configuration and a cross-sectional view of a multilayer through type capacitor array of an eighth embodiment of the present invention.
Figure 10B:
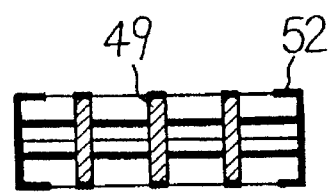

In a multilayer through type capacitor array of a configuration example shown in FIGS. 10a and 10b, a terminal electrode 52 similar to the terminal electrode 9 of the conventional multilayer through type capacitor of FIGS. 1i and 1j is provided on the multilayer through type capacitor array shown in FIGS. 7a and 7b.

Figure 11A:
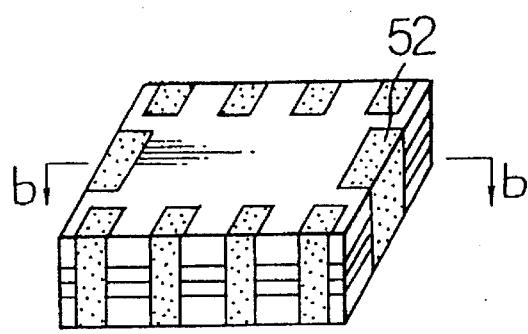
FIGS. 11a and 11b represent an overall configuration and a cross-sectional view of a multilayer through type capacitor array of a first configuration example related to the present invention.
Figure 11B:
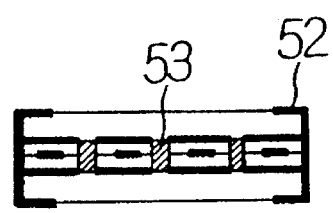

In a multilayer through type capacitor array of a configuration example of FIGS. 11a and 11b, the conductive material 49 in the multilayer through type capacitor array shown in FIGS. 10a and 10b is designed as a small conductive material 53, and conductive material 52, which connects the first internal electrode 35 and the second internal electrode 37, is provided outside.

Figure 12A:
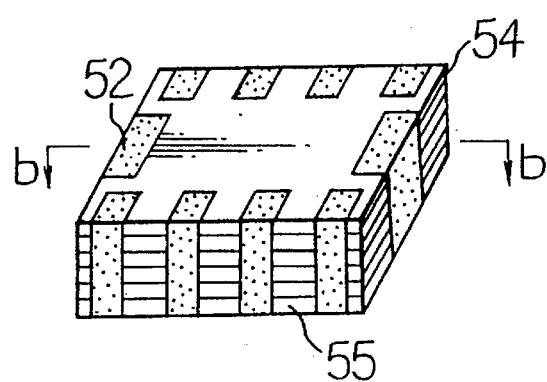
FIGS. 12a and 12b represent an overall configuration and a cross-sectional view of a multilayer through type capacitor array of a second configuration example related to the present invention.
Figure 12B:
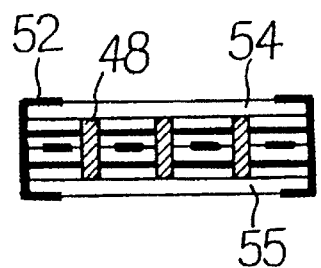

In a multilayer through type capacitor array of a configuration example shown in FIG. 12a and 12b, two layers of dielectric sheets 54 and 55 are laid on the multilayer through type capacitor array shown in FIGS. 7a and 7b.

In the embodiments described above, the dielectric sheet is designed in rectangular form, however the dielectric sheet may be designed in any form according to the present invention can be achieved.

The plurality of internal electrodes contacts may be placed at any position according to the present invention. A single internal electrode contact may be placed at any position according to the present invention.

As is evident from the above explanation, it is possible by electrostatic shielding of conductive material filled in the through-holes to provide a decrease of crosstalk and uniform electrical characteristics for each multilayer through type capacitor, to miniaturize the multilayer through type capacitor array, and to reduce difficulties when mounting.

We claim:

1. A multilayer through type capacitor array having a rectangular parallelepiped shape, comprising a first dielectric sheet, a second dielectric sheet, a third dielectric sheet and a fourth dielectric sheet, each designed in rectangular form and placed in this order, on said first dielectric sheet a single first internal electrode made of conductive material, extended in longitudinal direction of the rectangle and reaching only the two shorter sides of the rectangle being provided, on said second dielectric sheet a plurality of second internal electrodes made of conductive material, extended in lateral direction of the rectangle and reaching the longer sides of the rectangle being provided, and on said third dielectric sheet, a single third internal electrode made of conductive material, extended in longitudinal direction of the rectangle and reaching the two shorter sides of the rectangle being provided, and a plurality of through type capacitors where said second internal electrodes are used as central conductor and said first internal electrode and said third internal electrode are used as external conductor, whereby:

a plurality of first holes are extended along said second internal electrodes between said plurality of second internal electrodes on said second dielectric sheet;

a plurality of second holes are formed on said first dielectric sheet, at positions corresponding to the positions where said first holes are formed;

a plurality of third holes are formed on said third dielectric sheet, at positions corresponding to the positions where said first holes are formed;

first conductive materials are filled in each of said plurality of first holes;

second conductive materials are filled in each of said plurality of second holes;

third conductive materials are filled in each of said plurality of third holes;

said first internal electrode is electrically connected to said first conductive materials;

said third internal electrode is electrically connected to said third conductive materials; and said first, second and third conductive materials, placed at corresponding positions respectively, are electrically connected to form a plurality of inner shielding electrodes.

2. A multilayer through type capacitor array according to claim 1, wherein a conductive material is provided outside to connect said first internal electrode and said third internal electrode.

3. A multilayer through type capacitor array according to claim 1, wherein a terminal electrode is provided on lower surface of said first dielectric sheet to connect said plurality of inner shielding electrodes.

4. A multilayer through type capacitor array according to claim 3, wherein a conductive material is provided outside to connect said first internal electrode and said third internal electrode.

5. A multilayer through type capacitor array according to claim 1, wherein a plurality of fourth holes are formed on said fourth dielectric sheet, at positions corresponding to said plurality of third holes, and said plurality of fourth holes are filled with conductive materials to be electrically connected with third conductive materials.

6. A multilayer through type capacitor array according to claim 5, wherein a conductive material is provided outside to connect said first internal electrode and said third internal electrode.

7. A multilayer through type capacitor array according to claim 5, wherein a terminal electrode is provided on lower surface of said first dielectric sheet to connect said plurality of inner shielding electrodes.

8. A multilayer through type capacitor array according to claim 7, wherein a conductive material is provided outside to connect said first internal electrode and said third internal electrode.

9. A multilayer through type capacitor array according to claim 7, wherein a terminal electrode is provided on upper surface of said fourth dielectric sheet to connect said plurality of inner shielding electrodes.

10. A multilayer through type capacitor array according to claim 9, wherein a conductive material is provided outside to connect said first internal electrode and said third internal electrode.

11. A multilayer through type capacitor array forming in rectangular parallelepiped shape, comprising a first dielectric sheet, a second dielectric sheet, a third dielectric sheet and a fourth dielectric sheet, each designed in rectangular form and placed in this order, on said first dielectric sheet a single first internal electrode made of conductive material, extended in longitudinal direction of the rectangle and reaching the two shorter sides of the rectangle being provided, on said second dielectric sheet a plurality of second internal electrodes made of conductive material, extended in lateral direction of the rectangle and reaching the longer sides of the rectangle being provided, and on said third dielectric sheet a single third internal electrode made of conductive material, extended in longitudinal direction of the rectangle and reaching the two shorter sides of the rectangle being provided, and a plurality of through type capacitors where said second internal electrodes are used as central conductor and said first internal electrode and said third internal electrode are used as external conductor, whereby:

a plurality of first holes are extended along said second internal electrodes between said plurality of second internal electrodes on said second dielectric sheet;

a plurality of second holes are formed on said third dielectric sheet, at positions corresponding to the positions where said first holes are formed;

first conductive materials are filled in each of said plurality of first holes;

second conductive materials are filled in each of said plurality of second holes;

said first internal electrode is electrically connected to said first conductive materials;

said third internal electrode is electrically connected to said second conductive materials;

said first and second conductive materials, placed at corresponding positions respectively, are electrically connected to form a plurality of inner shielding electrodes; and a conductive material is provided outside to connect said first internal electrode and said third internal electrode, and to form an outer electrode.

12. A multilayer through type capacitor array having a rectangular parallelepiped shape and comprising a plurality of through type capacitors, each of said through type capacitor comprising a first dielectric sheet, a second dielectric sheet, a third dielectric sheet and a fourth dielectric sheet, each designed in rectangular form and placed in this order, on said first dielectric sheet a single first internal electrode made of conductive material, extended in longitudinal direction of the rectangle and reaching only the two shorter sides of the rectangle being provided, on said second dielectric sheet a plurality of second internal electrodes made of conductive material, extended in lateral direction of the rectangle and reaching the longer sides of the rectangle being provided, and on said third dielectric sheet, a single third internal electrode made of conductive material, extended in longitudinal direction of the rectangle and reaching the two shorter sides of the rectangle being provided, said second internal electrodes are used as central conductor and said first internal electrode and said third internal electrode are used as external conductor in each of said plurality of through type capacitors, whereby:

a plurality of inner shielding electrodes disposed between said plurality of through type capacitors, said plurality of inner shielding electrodes running substantially parallel to said second internal electrodes and extending from said first internal electrodes to said third internal electrodes such that said plurality of inner shielding electrodes electrically connect said first and said third internal electrodes.

13. A multilayer through type capacitor array according to claim 12, wherein a conductive material is provided outside to connect said first internal electrode and said third internal electrode.

14. A multilayer through type capacitor array according to claim 12, wherein a terminal electrode is provided on lower surface of said first dielectric sheet to connect said plurality of conductive materials.

15. A multilayer through type capacitor array according to claim 14, wherein a conductive material is provided outside to connect said first internal electrode and said third internal electrode.

16. A multilayer through type capacitor array according to claim 12, wherein said plurality of inner shielding electrodes are extended through said fourth dielectric sheet.

17. A multilayer through type capacitor array according to claim 16, wherein a conductive material is provided outside to connect said first internal electrode and said third internal electrode.

18. A multilayer through type capacitor array according to claim 16, wherein a terminal electrode is provided on lower surface of said first dielectric sheet to connect said plurality of conductive materials.

19. A multilayer through type capacitor array according to claim 18, wherein a conductive material is provided outside to connect said first internal electrode and said third internal electrode.

20. A multilayer through type capacitor array according to claim 18, wherein a terminal electrode is provided on upper surface of said fourth dielectric sheet to connect said plurality of conductive materials.

21. A multilayer through type capacitor array according to claim 20, wherein a conductive material is provided outside to connect said first internal electrode and said third internal electrode.

* * * * *